United States Patent
Nichols

(10) Patent No.: US 10,282,526 B2
(45) Date of Patent: May 7, 2019

(54) GENERATION OF RANDOMIZED PASSWORDS FOR ONE-TIME USAGE

(71) Applicant: Hand Held Products, Inc., Fort Mill, SC (US)

(72) Inventor: Matthew Nichols, Pittsburgh, PA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 136 days.

(21) Appl. No.: 14/963,943

(22) Filed: Dec. 9, 2015

(65) Prior Publication Data

US 2017/0169198 A1    Jun. 15, 2017

(51) Int. Cl.
*G06F 21/31* (2013.01)

(52) U.S. Cl.
CPC ........................ *G06F 21/31* (2013.01)

(58) Field of Classification Search
CPC ........................................................... G06F 21/31
See application file for complete search history.

(56) References Cited

U.S. PATENT DOCUMENTS

| | | | |
|---|---|---|---|
| 5,892,470 A * | 4/1999 | Kusnick | H03M 7/08 341/106 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,210,622 B2 * | 5/2007 | Lambert | G06F 21/31 235/379 |
| 7,413,127 B2 | 8/2008 | Ehrhart et al. | |

(Continued)

FOREIGN PATENT DOCUMENTS

| | | |
|---|---|---|
| GB | 2379525 A | 3/2003 |
| JP | 2011-022953 A | 2/2011 |

(Continued)

OTHER PUBLICATIONS

U.S. Appl. No. 14/715,916 for Evaluating Image Values filed May 19, 2015 (Ackley); 60 pages.

(Continued)

*Primary Examiner* — Saleh Najjar
*Assistant Examiner* — Louis C Teng
(74) *Attorney, Agent, or Firm* — Additon, Higgins & Pendleton, P.A.

(57) ABSTRACT

An electronic device dynamically generates a password for one-time only usage. The one-time password is constructed by placing, in a random sequential order: (i) several randomly chosen digits and (ii) several digits, which are randomly selected from personal identification numbers, which were previously provided by an authorized user. The current user of the device is presented with a natural-language password hint, which describes the sequence of digits in the password. Only the authorized user knows the personal identification numbers; and so is able to construct, on-the-fly, the one-time password, and present that password to the device. The password hint may be presented aloud, in audio form, and the password may be entered into the device via speech. If someone nearby hears the hint and/or the password, they cannot use it at a later time to gain device control or data access, since the password is only valid the one time.

21 Claims, 4 Drawing Sheets

(56) References Cited

U.S. PATENT DOCUMENTS

| | | | |
|---|---|---|---|
| 7,613,919 B2* | 11/2009 | Bagley | H04L 63/083 713/155 |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,386,461 B2* | 2/2013 | Bachmann | G06F 21/645 707/711 |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,756,652 B2* | 6/2014 | Jakobsson | G06F 21/31 713/165 |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |
| 8,910,870 B2 | 12/2014 | Li et al. | |
| 8,910,875 B2 | 12/2014 | Ren et al. | |
| 8,914,290 B2 | 12/2014 | Hendrickson et al. | |
| 8,914,788 B2 | 12/2014 | Pettinelli et al. | |
| 8,915,439 B2 | 12/2014 | Feng et al. | |
| 8,915,444 B2 | 12/2014 | Havens et al. | |
| 8,916,789 B2 | 12/2014 | Woodburn | |
| 8,918,250 B2 | 12/2014 | Hollifield | |
| 8,918,564 B2 | 12/2014 | Caballero | |
| 8,925,818 B2 | 1/2015 | Kosecki et al. | |

(56) References Cited

U.S. PATENT DOCUMENTS

| | | |
|---|---|---|
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 2006/0080545 A1* | 4/2006 | Bagley ................ H04L 63/083 713/183 |
| 2006/0136219 A1 | 6/2006 | Wang |
| 2007/0063048 A1 | 3/2007 | Havens et al. |
| 2008/0141345 A1* | 6/2008 | Gavrilos ................ G06F 21/31 726/4 |
| 2009/0134221 A1 | 5/2009 | Zhu et al. |
| 2009/0288148 A1 | 11/2009 | Headley et al. |
| 2009/0313269 A1* | 12/2009 | Bachmann ........... G06F 21/645 |
| 2010/0114573 A1* | 5/2010 | Huang ..................... G10L 17/24 704/250 |
| 2010/0115465 A1* | 5/2010 | Lu ........................... G06F 21/31 715/810 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2011/0225064 A1* | 9/2011 | Fou ....................... G06Q 20/12 705/26.41 |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0221467 A1* | 8/2012 | Hamzeh ................ G06Q 20/20 705/40 |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |

(56) References Cited

U.S. PATENT DOCUMENTS

| | | |
|---|---|---|
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0189885 A1* | 7/2014 | Golan ............... G06F 21/32 726/28 |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0223550 A1* | 8/2014 | Nagar ............... G06F 21/31 726/19 |
| 2014/0231500 A1 | 8/2014 | Ehrhart et al. |
| 2014/0232930 A1 | 8/2014 | Anderson |
| 2014/0245380 A1* | 8/2014 | Jakobsson ......... G06F 21/31 726/1 |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0121509 A1* | 4/2015 | Nakazato ........... H04L 63/0838 726/18 |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0227732 A1* | 8/2015 | Doctor ............... G06F 21/31 726/4 |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0036800 A1* | 2/2016 | Carpenter ......... G06Q 20/4014 726/6 |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0080366 A1* | 3/2016 | Agarwal ............ H04L 63/0838 726/6 |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |

(56) References Cited

U.S. PATENT DOCUMENTS

| | | | |
|---|---|---|---|
| 2016/0124516 | A1 | 5/2016 | Schoon et al. |
| 2016/0125217 | A1 | 5/2016 | Todeschini |
| 2016/0125342 | A1 | 5/2016 | Miller et al. |
| 2016/0133253 | A1 | 5/2016 | Braho et al. |
| 2016/0171720 | A1 | 6/2016 | Todeschini |
| 2016/0178479 | A1 | 6/2016 | Goldsmith |
| 2016/0180678 | A1 | 6/2016 | Ackley et al. |
| 2016/0189087 | A1 | 6/2016 | Morton et al. |
| 2016/0125873 | A1 | 7/2016 | Braho et al. |
| 2016/0227912 | A1 | 8/2016 | Oberpriller et al. |
| 2016/0232891 | A1 | 8/2016 | Pecorari |
| 2016/0292477 | A1 | 10/2016 | Bidwell |
| 2016/0294779 | A1 | 10/2016 | Yeakley et al. |
| 2016/0306769 | A1 | 10/2016 | Kohtz et al. |
| 2016/0314276 | A1 | 10/2016 | Wilz, Sr. et al. |
| 2016/0314294 | A1 | 10/2016 | Kubler et al. |

FOREIGN PATENT DOCUMENTS

| | | |
|---|---|---|
| JP | 2013-073272 A | 4/2013 |
| WO | 98/23062 | 5/1998 |
| WO | 2013163789 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Bamdringa); 38 pages.

U.S. Appl. No. 14/740,373 for Calibrating a Volume Dimensioner filed Jun. 16, 2015 (Ackley et al.); 63 pages.

Combined Search and Examination Report in counterpart UK Application No. GB1618546.4 dated Apr. 13, 2017, pp. 1-6.

U.S. Appl. No. 13/367,978, filed Feb. 7, 2012, (Feng et al.); now abandoned.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

Examination Report in counterpart UK Application No. GB1618546.4 dated Mar. 7, 2019, pp. 1-5.

\* cited by examiner

GENERATION OF RANDOMIZED PASSWORDS FOR ONE-TIME USAGE

FIELD OF THE INVENTION

The present invention relates to the field of password protection for electronic systems. The present invention relates more specifically to secure audio password protection for portable electronic systems, employing randomized elements, which include digits identifiable only by an authorized user.

BACKGROUND

Generally speaking, many electronic devices, and specifically information processing devices, provide access to data that is meant for limited audiences. Various means may be employed to ensure that the private, secure data is accessible only to specified persons or authorized persons.

One known means for controlled access is password protection. With password protection, an authorized person either supplies a unique password or is assigned a unique password (e.g., by a system administrator). The password is typically a specific sequence of characters, that is, letters, numbers, punctuation, and other keyboard symbols. In order to access the secure data, an authorized user must first enter the appropriate password. In some cases, password access is required specifically before accessing the secure data. In other systems, password access may be required to initialize an entire, custom software package that is used to access the secure data. In still other cases, password access may be required to access a network or network server, which stores the secure data.

In general, for password access control to be effective, the password should be known only to those persons who are allowed access to the secure data. If the password becomes known to persons other than the authorized user(s) of the data, then those other persons, who are unauthorized, may be able to obtain access to the data as well.

Passwords are often entered via a keyboard, which typically allows some degree of privacy. Consider an authorized user entering a password via a keyboard and display screen (or a touch screen display). Even if unauthorized persons are present in the room, and are in general proximity to the keyboard, a display screen will typically show masking characters (such as asterisks ("*****")) in place of the password characters. This prevents the nearby-unauthorized person from reading the password on the display screen. Also, the authorized user who is typing a password may employ various precautions to ensure that other, nearby persons do not see the keyboard as the password is being typed. In many cases, simply the rapid motion of human fingers while typing prevents a nearby person from being able to ascertain the password sequence.

However, it is increasingly common for electronic devices to be voice controlled and voice activated. An example is the VOCOLLECT™ VOICE INSPECTION™ system, which is used for data input and data output in hands-busy, eyes-busy environments (e.g., factories, warehouses, and repair shops). Such a system enables the user to control the electronic device, and to access and modify data, using voice commands. The system may also provide information via audio means, such as a simulated voice.

With such voice-actuated systems, a problem arises regarding password protection. To be truly hands free, and totally voice-driven, an authorized user may need to provide a password in the form of an audio command. For example, the authorized user may be prompted for the password, and then the authorized user recites each element of the password aloud. (The device can then process the password to determine if it is correct, and then provide suitable data access.)

If a password is provided by speech, that is, via words spoken aloud by the authorized user, then any unauthorized persons in nearby proximity may be able to hear the password. The unauthorized persons would then know the password, and so may be able to have unauthorized access to the secure data.

Therefore, a need exists for a system and method for secure password entry where the password is spoken aloud. One means might be for the authorized user, or a system administrator, to create a new, unique password at frequent time intervals. However, such a system would present significant inconveniences and impracticalities both for the authorized user and system administrator.

Therefore, more specifically, a need exists for a convenient system to automatically create one-time passwords for each password entry. Such a system must also be able to convey the password to the authorized user, preferably by audio means, in a way that still maintains the security of each one-time, unique password.

With such a system, a password which is spoken aloud once—and which may be heard by unauthorized users—is only useful that one time, and so cannot be used on a later occasion by an unauthorized user. To be effective, such a one-time, unique password system must be convenient for the authorized users.

SUMMARY

Accordingly, in one aspect, the present invention embraces an information processing system which includes a microprocessor (or simply "processor"), memory associated with the processor, an element for audio communication of data to a person (for example, a speaker or headphones), and an element to receive data from a person via audio communications (for example, a microphone). The system may also include a display screen, a keyboard, and wired or wireless communications elements, for example BLUETOOTH™ or Wi-Fi communications subsystems.

In an exemplary embodiment, the system is configured to obtain, from an authorized user, one or more strings of personal numbers that are well-known to the authorized user. Such strings might be a date of birth, a social security number, a home zip code, or similar. On an as-needed basis, the system constructs a one-time password by randomly selecting digits from the personal numbers, and combining those with other random digits. The system prompts the user for the password, in the form of a description of the unique password. The user can then enter the password via voice reception (that is, speaking the one-time password into a microphone).

In another exemplary embodiment, the system may be configured to obtain one or more alphabetic, or combined alphanumeric strings, which are personal to the authorized user and well-known to the authorized user. Such strings might include a full street address, first names of family members, or similar.

The system constructs a one-time password by randomly selecting letters and/or digits from the personal data, and combines those with other random letters and/or digits. The system prompts the user for the password, in the form of a description of the unique password. The user can then enter the password via voice reception (that is, speaking the unique, one-time password into a microphone).

In yet another exemplary embodiment, the system may interact with the authorized user via visual and tactile interfaces, such as a display screen or keyboard. For example, the password hints may be presented on a display, and the user may enter the one-time password via the keyboard. A mouse or other data entry means may be employed as well.

The foregoing illustrative summary, as well as other exemplary objectives and/or advantages of the system and method, and the manner in which the same are accomplished, are further explained within the following detailed description and its accompanying drawings.

DETAILED DESCRIPTION

In this document, the terms "pass code" and "password" are used synonymously and interchangeably.

While not employed elsewhere in this document, other terms such as "pin", "confirmation number" and "security code" are often used to describe some pass codes (particularly brief pass codes, such as four-digit codes). For present purposes, such "pins", "confirmation numbers", "security codes", or similar private control numbers, or sequences of symbols for secure data access, are essentially synonymous with "password" or "pass code", and fall within the scope of the present system and method.

In this document, the words or phrases "pass code hint", "password hint", "pass code prompt", "password prompt", or simply "hint" or "prompt", are used synonymously and interchangeably.

In this document, the term "characters" refers to any of digits, alphabetic symbols, punctuation, and/or other keyboard characters such as are typically used in passwords.

While all the examples in this document are of passwords and password characters in English, this is for convenience only. Many other languages, with their respective alphabets and symbols, may be employed to create one-time passwords within the scope of the present system and method.

This document makes reference to a "one-time password," "unique password," or "unique, one-time password." Persons skilled in the art will appreciate that a password, generated according to the present system and method, may not be unique or "one-time" for all time. A password system will typically have a limited number of characters, e.g., no more than four (4) characters or no more than ten (10) characters, etc. Such a limited sequence of characters, drawn from a finite library of available characters (e.g., the symbols on a standard English keyboard), has a finite number of possible combinations. If enough passwords are generated, randomly or otherwise, then repeat (duplicate) passwords will eventually appear.

It will be understood then that a "unique password" or "one-time password" refers to a password, which is only used once before another password is generated; and further, to a password, which is reasonably likely to be distinctive, or unique compared to the previously used password and compared to the next password likely to be generated. In an embodiment of the present system and method, several dozen one-time passwords, or even several hundred passwords, may be generated successively over time, with a reasonable likelihood that all such passwords will be distinct from each other.

FIG. 1.

Figure 1:
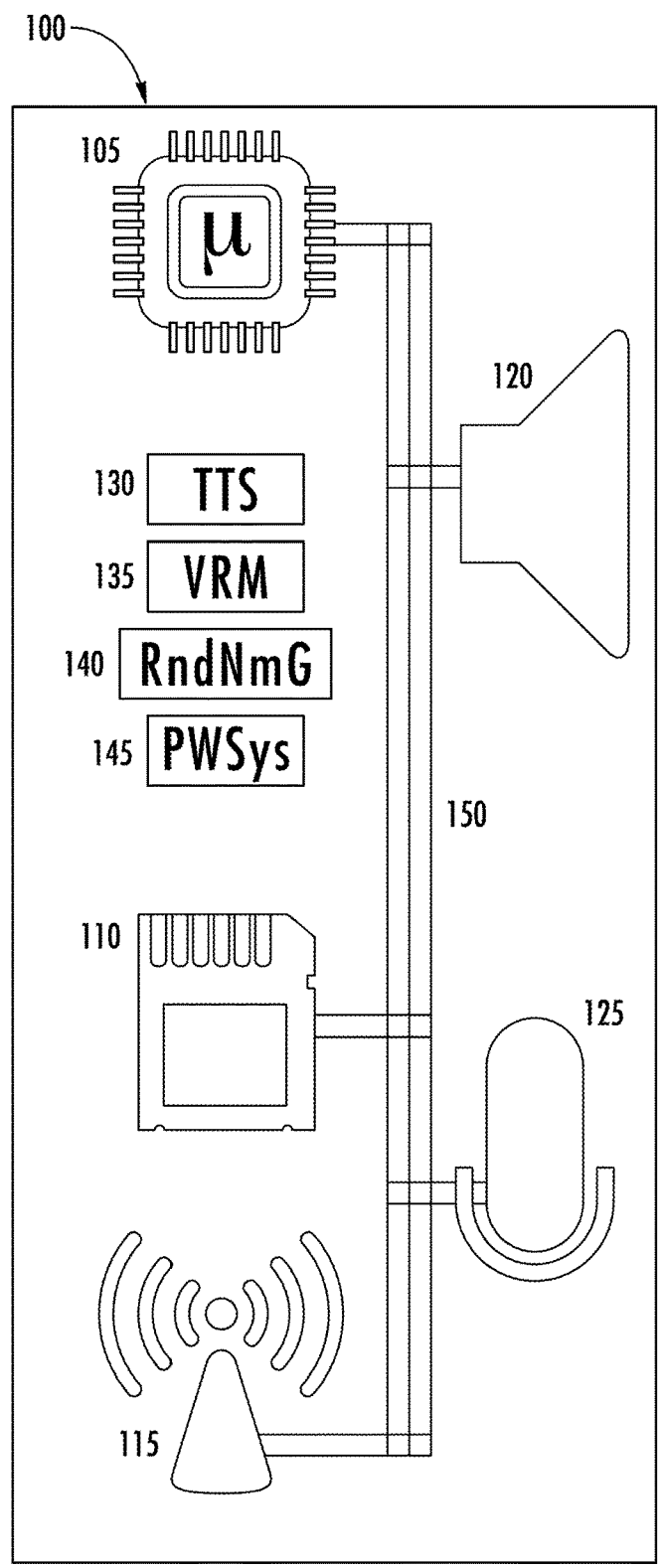
FIG. 1 schematically depicts a system diagram of an exemplary electronic device according to the present system and method.

Referring now to FIG. 1, the present system and method embraces electronic devices (100) which may be mobile (e.g., cellular phones, smart phones, tablet devices, personal digital assistants, portable computers, vehicle-mount computers), stationary (e.g., desktop computers), or distributed (e.g., network systems) having an improved method for password protection for user access. The present system and method has applicability to devices which employ audio user interfaces (120, 125) for input and output (typically a microphone and speakers or headsets); and also has applicability for systems employing visual and/or motion driven user interfaces (e.g., a display monitor and/or keyboard, mouse, etc.) (not shown in the figure).

In an embodiment, an electronic device (100) according to the present disclosure includes a processor (105), memory (110), and user audio interfaces elements (120, 125) as described immediately above, e.g., a microphone (125), and a speaker or headset (120). In an alternative embodiment, an electronic device according to the present disclosure may include a display monitor, a keyboard, a touch-screen display, a holographic interface, and/or a mouse, touch-pad, and/or other means (not illustrated in the figure) for purposes of user interface and interaction.

The electronic device may also include a wireless communication system (115). The processor (105) is communicatively coupled to the memory (110), and the user interface (120, 125), and the wireless communication system (115).

It will be understood by persons skilled in the art that the memory (110) shown in FIG. 1 is schematic only, and may represent one type of memory element, or multiple types of memory elements (as discussed further below) which are employed in the electronic device (100).

The exemplary electronic device (100) may include a system bus (150) and/or one or more internal interface circuits (not shown) for communicatively coupling the processor (105) and other components (memory (110), wireless communications system 115), and user interface (120, 125) to each other.

Various embodiments of system bus architecture, well known in the art or to be developed, may provide for efficient data transfer and/or communication between the components (105, 110, 115, 120, 125) of the device (100) and may be employed in exemplary embodiments in accordance with the present disclosure.

Typically, the processor (105) is configured to execute instructions and to carry out operations associated with the electronic device (100). For example, using instructions retrieved from the memory (110) (e.g., a memory block), the processor (105) may control the reception and manipulation of input and output data between internal components of the electronic device (100). The processor (105) typically operates with an operating system to execute computer code and produce/use data. The operating system, other computer code, and data may reside within the memory (110) that is operatively coupled to the processor (105).

The memory (110) generally provides a place to store computer code and data that are used by the electronic device 10. The memory 12 may include Read-Only Memory (ROM), Random-Access Memory (RAM), a hard disk drive, and/or other non-transitory storage media.

The operating system, other computer code, and data may reside on volatile memory (110) which is permanently built into the electronic device (100) or installed in a slot on the device (100); or on one or more removable, non-transitory storage medium that is loaded or installed onto the electronic device (100) when needed. Exemplary removable non-transitory storage media include CD ROM, PC-CARD, memory card, flash drives, floppy disks, and/or magnetic tape, and/or such other data and code storage media as may be developed in the future.

The operating system, other computer code, and data may also be hard-coded into the electronic device (100) either as dedicated logic within the processor (105) or as non-volatile memory known as firmware (110).

In an embodiment, the instructions and data employed by the electronic device may be organized into one or more modules (130, 135, 140, 145). Such modules may be implemented, in whole or in part, as one or more of dedicated logic in the processor (105); firmware (110); dedicated, specialized processors (represented or subsumed in FIG. 1 by the processor (105)); and/or volatile memory (110).

Exemplary modules which may be employed include:
a text-to-speech module (TTS) (130), which converts textual data and textual output into spoken (voice) language to be output via the speakers (120);
a voice recognition module (VRM) (135), which converts speech received via the microphone (125) into text or other forms of data subject to logical processing by the electronic device (100);
a random number generator (RndNmG) (140) which generates random numbers (or pseudo-random numbers); and
a password system (PWSys) (145) which may generate and/or process passwords according to the present system and method, as described further below in this document.

It will be understood by persons skilled in the relevant arts that the random number generator (140) may employ any of several random number generation algorithms and methods well known in the art, or may employ new or novel methods yet to be developed. Both physical and algorithmic methods of random number generation may be employed, consistent with the present system and method.

As noted, the electronic device (100) typically includes a wireless communication system (115). The wireless communication system (115) enables the electronic device (100) to communicate with a wireless network, such as a cellular network (e.g., a GSM network, a CDMA network, or an LIE network), a local area network (LAN), and/or an ad hoc network.

The electronic device (100) may also include one or more wired communications systems (not illustrated) such as Ethernet ports or USB ports.

FIG. 2.

Figure 2:
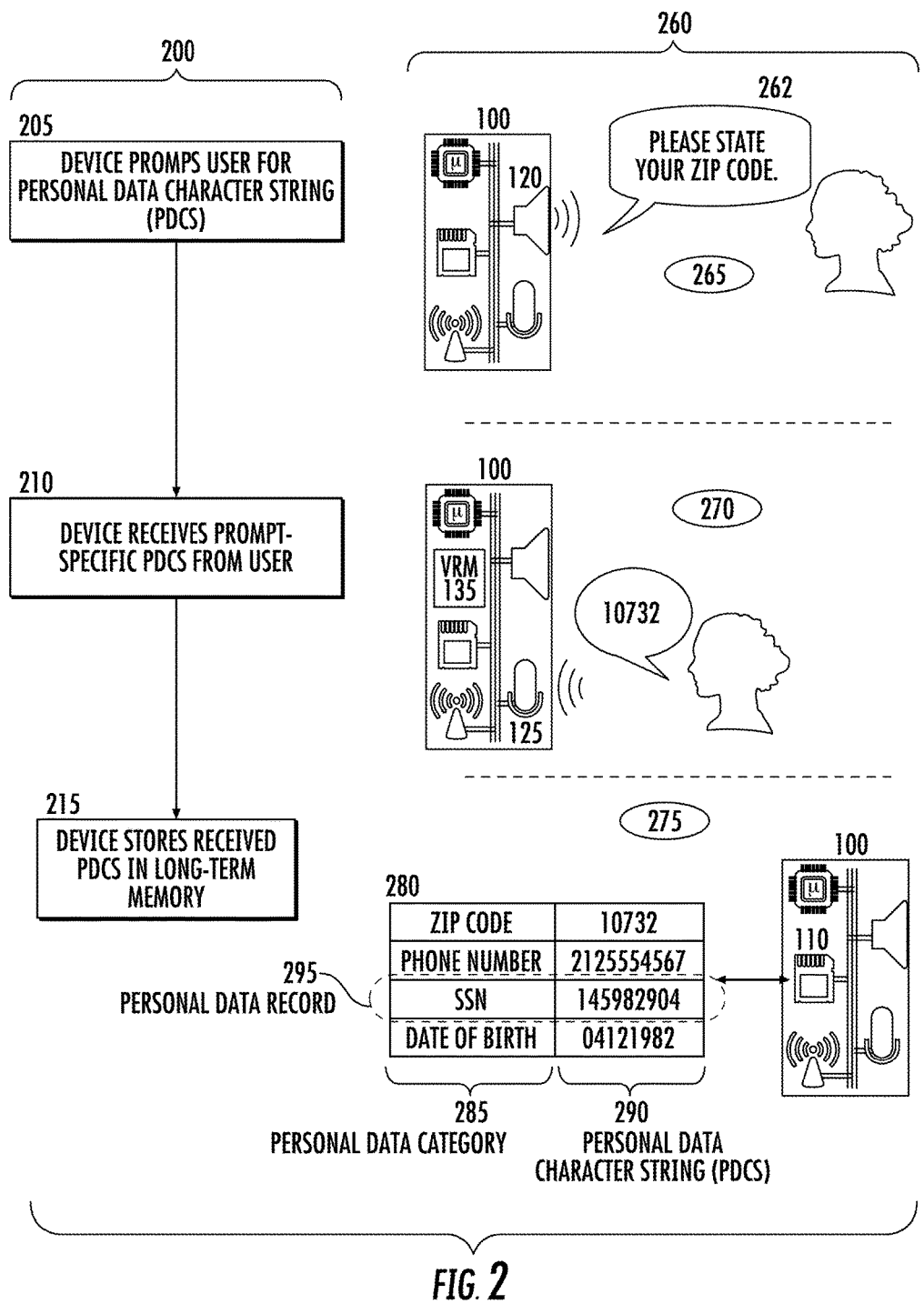
FIG. 2 graphically depicts an exemplary method for an authorized user to enter, into an electronic device, one or more personal data character strings (PDCSs) for use in generating a one-time password.

Referring now to FIG. 2, the present system, and method embraces data reception methods, which are operable on an electronic device (100), such as the exemplary electronic device discussed above in relation to FIG. 1. FIG. 2 illustrates, both in a flow chart and via illustration of a specific example, an exemplary method for an electronic device (100) to obtain and store personal data character strings.

A "personal data character string" (PDCS) (290), as defined herein, is any series of numbers, alphabetic characters (including characters in languages other than English), or other character symbols which is used for personal identification, or is otherwise distinctively associated with an individual person (or in some cases, as with a home address, may be distinctively associated with a small number of people). In an embodiment, a personal data character string is always multiple characters, and may be required to have a minimum length (for example, at least four characters). In an alternative embodiment, some personal character data strings may be allowed to be just a single character in length.

Typical examples of personal data character strings (PDCSs) (290) are home addresses, zip codes, phone numbers, social security numbers (SSNs), dates of birth, e-mail addresses, or even credit card numbers, the year of graduation from college, the year of marriage, or similar. A PDCS (290) may also be first or last names of a family member, a family member birth date, and other such data that a person knows and the person is familiar with by way of distinctive personal associations. A PDSC (290) may also be a character string based on personal preferences or likes, for example, the name of a favorite flavor of ice cream, the name of a favorite movie star, the jersey number (shirt number, uniform number) of a favorite athlete, or similar.

A PDCS (290) may be "distinctive", in some cases, by being completely unique to the particular person. Examples of such unique personal data character strings (290) include social security numbers and cell phone numbers.

In other cases, the "distinctiveness" of a PDCS lies in the fact that, while not being unique to a person, there are many different plausible or conceivable values for the string; and further, in that it is difficult or unlikely for most other persons to know the particular value of the PDCS (290) for the authorized user. Examples of such non-unique but distinctive PDCSs (290) include birth dates, street address numbers, zip codes, places of birth, first names of family members, and similar data values. For example, dates of birth may have any of 366 different values; but any one user has only one birth date of the 366 possible values, and that date is generally unknown to most other persons.

In an embodiment of the present system and method, PDCSs (290) may be limited to only those strings of data, which are totally numerical, for example, phone numbers, zip codes, social security numbers, and dates of birth. In an alternative embodiment, PDCSs (290) may be strictly alphabetic, for example, the street name of a person's home address, or the name of a city where a person grew up or went to college. In an alternative embodiment, a PDCS (290) may have both numeric and alphabetic characters.

An exemplary method (200) for an electronic system to collect and store one or more PDCSs is presented in FIG. 2. The method is also illustrated in a parallel storyboard (260).

In step 205 of method 200, the device prompts the user for a specific PDCS (290), such as a social security number, date of birth, or similar. The prompt may be presented as an audio prompt (262) or as a text prompt on a display screen (not shown), for example, as part of a dialog box. Panel 265 of storyboard 260 illustrates the electronic device (100) presenting, to a user, an audio prompt (262) (via speaker (120)) for a specific data category (285) of PDCS, for example the person's zip code.

In step 210 of method 200, the device receives, from the user, a personal data character string (290) which is specific to the personal data category (285) presented in the prompt (262) of step 205. The user may enter the data via a keyboard (not shown) or a touch screen display (not shown), or other data entry means provided for by the electronic device (100). Panel 270 of storyboard 260 illustrates the user entering the zip code by means of speaking the zip code aloud. The speech is detected by the microphone (125) of the electronic device (100). The detected speech may then be translated into text symbols by means of the Voice Recognition Module (135).

In an embodiment of the present system and method, the above steps 205 and 210 may be repeated as necessary to obtain multiple different personal data strings (290) from the user, which are stored as multiple respective personal data records (295), discussed immediately below.

In step 215 of method 200, the device stores one or more personal data records (295) for the user. A personal data record (295) pairs, or associates, a personal data category (285) (such as "zip code" or "phone number") with a specific personal data character string (290).

The personal data records (295) may be stored in a long-term or non-volatile memory (110), for retrieval on multiple future occasions. Panel 275 of storyboard 260 illustrates multiple personal data records (295) which are stored for a particular user, for example, the user's zip code, phone number, social security number, and date of birth.

In an embodiment, each personal data record (295) is stored with two component parts: the numeric string, text string or generally a personal data character string (PDCS) (290) of the personal data record; and an associated description or data category (285) (e.g., "zip code", "phone number", etc.). The description or data category (285) may aid the device (100) in later creating a prompt (262) for the PDCS (290). The PDCSs may be stored in a variety of different data structures well known in the art, including databases, databases tables (280), array structures, linked lists, or similar.

FIG. 3.

Figure 3:
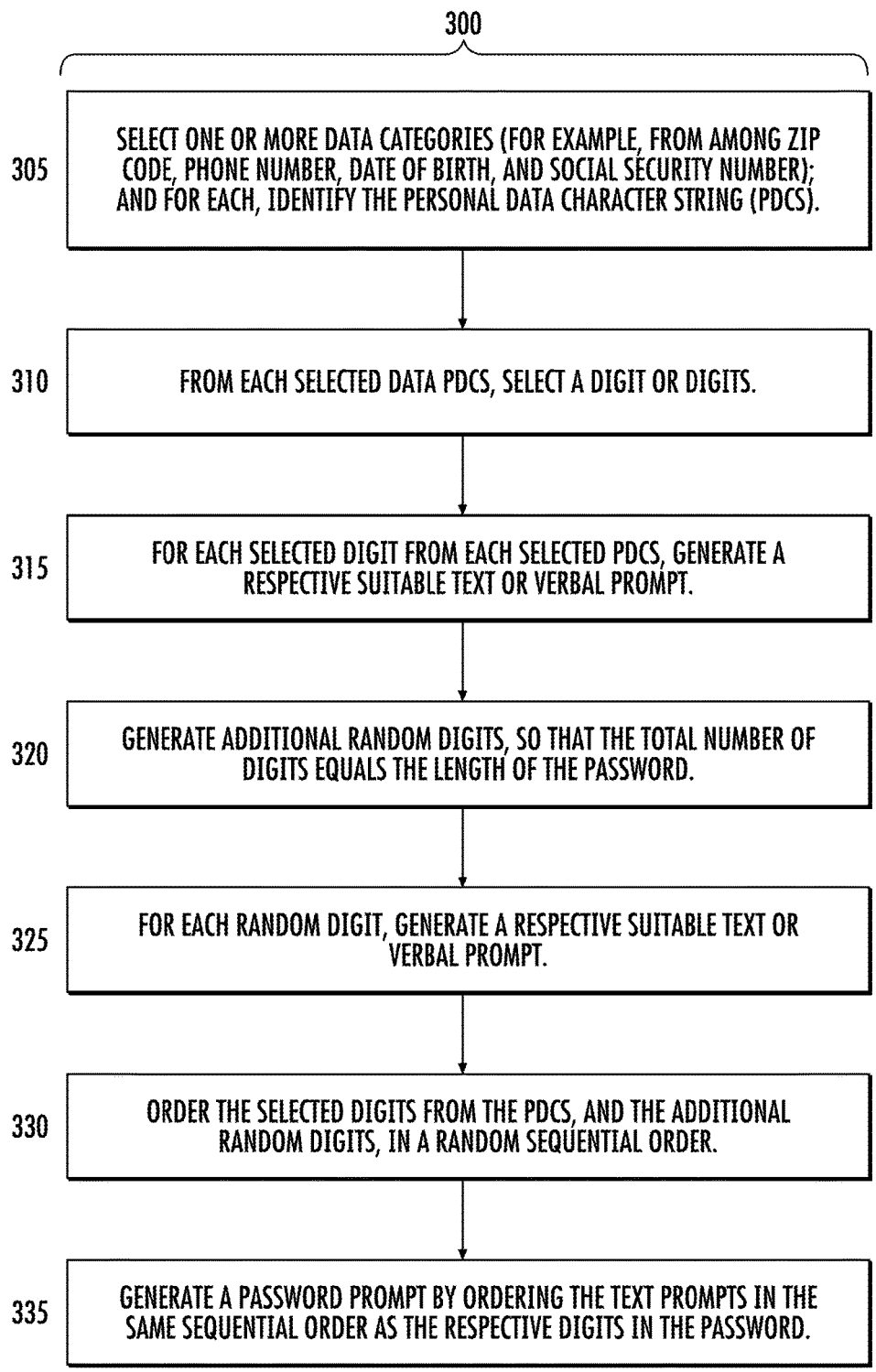
FIG. 3 is a flow chart of an exemplary method for generating a one-time password and a corresponding password hint or prompt.

Referring now to FIG. 3, the present system and method embraces password formation methods that are operable on an electronic device (100), such as the exemplary electronic device discussed above in relation to FIG. 1. FIG. 3 illustrates, in a flow chart, an exemplary method (300) for an electronic device (100) to create a unique, one-time password (405 [see FIG. 4]) based in part on the personal data records (295) created by method 200, or by similar methods.

It is noted here that FIG. 4, discussed below in this document, provides two specific illustrations of the application of method (300) discussed here.

In step 305 of method 300, the device randomly selects one or more specific personal data records (295) from among the personal data records (295) created and stored in method (200). For example, in a specific application of the method to generate a single one-time password—and from among such personal data categories (285) as SSN, date of birth, home phone number, and cell phone number—the method 300 may randomly select to use the category of home phone number.

In step 310, and for any one particular, selected personal data record (295), the method 300 randomly selects one or more individual characters (420 [see FIG. 4]) from the PDCS (290) of the selected record (295). In an embodiment, the number of characters (420) selected from one PDCS (290) may be one or two characters (420), or possibly several characters (420); but generally the characters selected are a subset of the characters in the PDCS (290).

In an alternative embodiment, all the characters (420) in a PDCS (290) may be selected. However, when combined into a password (405) (as described below), the selected characters (420) are typically not presented in the same sequential order as they are stored in the PDCS (290); they may be mixed in with additional characters as well.

For example, in step 310 the method 300 may randomly select the second character and the fourth character of the home phone number. (These characters may be, for example, "0" and "8".)

In step 315, and for each digit (420) selected from the PDCSs (290) of each selected data record (295), the method 300 generates a respective suitable text or verbal prompt. In an embodiment, the prompts will incorporate part or all of the text stored in the data category component (285) of each data record (295). In an embodiment, the prompt will also include the ordinal placement of the selected digit (420) in the PDCS (290). For example, in step 315 the method 300 may generate the descriptions: "the second character of your home phone number" and "the fourth character of your home phone number."

A person skilled in the art will appreciate that a prompt may be generated in any language suitable for the given user; examples given here in English are for convenience only.

In step 320, the method 300 first determines the length of the pass code. The length of the pass code may be defined in any number of ways including for example and without limitation: by hard-coding in the computer code of the method; or via a length parameter on a configuration screen (whereby the length may be varied at the discretion of the user or the system administrator); and/or via a length parameter stored in a configuration database; or by other means. In an embodiment, a pass code may have a range of allowed lengths, for example no less than four characters and no more than ten; in such an embodiment, the length for a given, particular instance of a pass code may be randomly determined, or determined by contextual (e.g., device usage) parameters.

The method then ascertains how many additional characters are required to achieve the necessary length of the pass code; in an embodiment, this is determined by the required length of the pass code, minus the number of characters selected in steps 305 and 310. For example, the required pass code length may be five characters, and two characters (420) (selected from personal data characters strings (290)) may have been previously selected; the required additional number of characters is then: 5−2=3.

Figure 4:
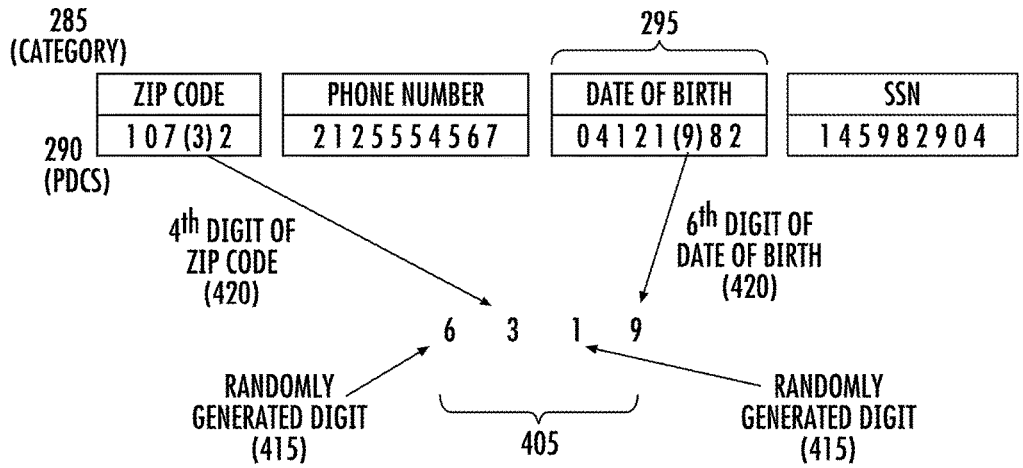
FIG. 4 illustrates two specific examples, according to an exemplary method, of generating a one-time password and a corresponding password hint or prompt.
Figure 4:
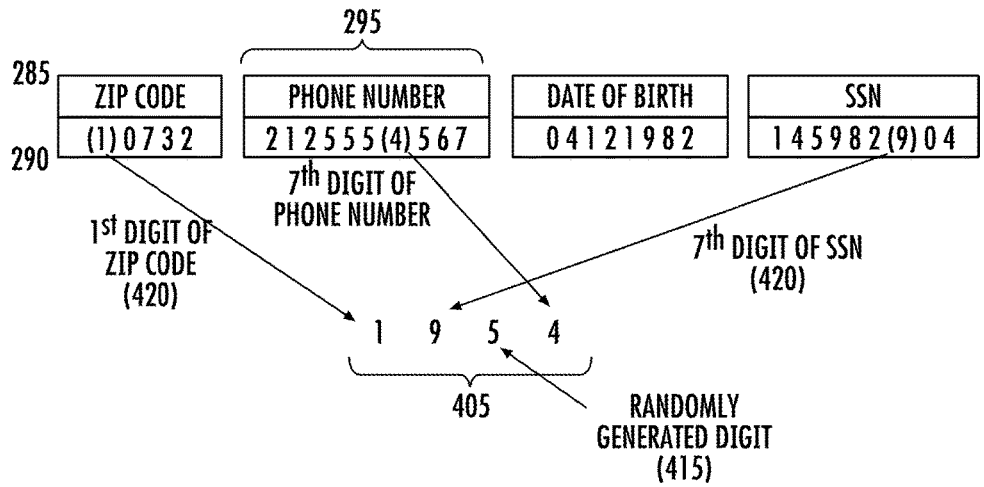

In step 320, the method 300 then generates the required number of additional characters (415, see FIG. 4). In an embodiment, each character is itself generated at random; for example "2", "7", and "5".

In step 325, the method 300 generates a suitable text (or verbal) prompt for each random digit (415) generated in step 320, for example: "the number 7" or "the digit 7", and similarly for other digits.

In step 330, the method 300 creates the one-time password (405). In an embodiment, the one-time password (405) is generated by ordering (i) the individual PDCS characters (420) selected from the personal data records (295), and (ii) the additional random digits (415), in a random sequential order.

For example, the digits presented above could be ordered as: "2 7 0 8 5", "5 8 7 2 0", "5 7 2 0 8", or (in this case, for five unique digits) any of 117 other possible random orderings.

In step 335, method 300 generates the pass code prompt (262). In an embodiment, this may be done by taking the individual prompts associated with individual characters (as per steps 315 and 325), and ordering them in the same sequential order as the respective digits (420) are ordered in the one-time pass code (405). For example, and using the exemplary digits described above, if the pass code is "5 8 7 2 0", then the prompt may be:

"The digit five, the fourth character of your home phone number, the digit seven, the digit two, the second character of your home phone number."

In an embodiment, a natural language module of the device (100) may insert additional text/words, or change text/words, in order to create a more effective user prompt. For example, the above prompt may be modified with additional text (underlined, below) as:

"To enter your pass code, please speak aloud the digit five, then speak the fourth character of your home phone number, then the digit seven, then the digit two, and finally speak the second character of your home phone number."

In an embodiment, other means may be employed to enhance the user-friendliness of the prompt (262). For example, when the user is prompted to speak a selected character (420) from a personal data record (295), the method may be modified to add a pause of a few seconds; this would give the user a few moments to mentally recollect the necessary PDCS (290), and to select the appropriate character (420) in their mind.

Persons skilled in the relevant arts will recognize that the method 300 is exemplary only, and other similar or related methods may be employed within the scope and spirit of the present system and method. For example, the steps of method 300 need not be performed in the order shown; other orderings of the steps are possible while yielding the same one-time pass code (405). Some steps may be consolidated into a single step (for example, generation of the pass code hint 315, 325, 335).

Alternative or additional steps may be employed as well within the scope and spirit of the present system and method. For example, instead of selecting personal data records (295) or specific characters (420) within the data elements on a purely random basis, a predetermined selection ordering system may be used. Such a system would still be hidden and essentially unpredictable from the standpoint of persons listening to the pass code prompt; and hence still substantially maintain a robust security level of the present system and method. Other variations are possible as well.

FIG. 4.

FIG. 4 illustrates the composition of two exemplary, different one-time pass codes, both based on the same PDCSs (290) for a single authorized user. In an embodiment, one of these pass codes (405) might be generated on a first occasion when the electronic device requests a pass code; while the second pass code might be generated on a later, subsequent occasion. The fact that the pass codes (405) are highly likely to be different from each other, from one occasion to the next, is an element of the high level of password security offered by the present system and method.

Both pass codes employ the same stored personal data records (295) for: the authorized user's zip code, phone number, date of birth (in mmddyyyy format), and social security number (SSN). The values (290) of these personal data elements, for the particular authorized user, are "10732", "2125554567", "04121982", and "145982904".

In the first example (400), the first pass code is created, according to an embodiment of the present system and method, by the random selection of individual PDCS characters (420)—here, the $4^{th}$ digit of the zip code [value=3], the $6^{th}$ digit of the date of birth [value=9], and two randomly generated digits (405) [values=6, 1].

In an embodiment, the number of digits which are to be selected from the PDCSs may itself be randomly determined. In an embodiment, the present system and method may establish a minimum number of required digits to be selected from a PDCS (290). For example, it may be required that a pass code (405) include at least two characters (digits, in this case) from at least two different personal data records (295).

Here, the values used to form the pass code (405) are 3, 9, 6, and 1. In an embodiment, the order of the randomly selected digits (415, 420) may also be randomly determined. In an alternative embodiment, other fixed ordering schemes, or context or usage dependent ordering schemes, may be employed.

Here, the digits have been randomly ordered to result in a pass code (405) of "6 3 1 9". The corresponding pass code prompt (262) reads: "Speak 6, then the 4th digit of your zip code, then 1, then the 6th digit of your date of birth."

In the second example (460), the second pass code is created, according to an embodiment of the present system and method, by the random selection of individual personal data element characters (420)—here, the $1^{st}$ digit of the zip code [value=1], the $7^{th}$ digit of the phone number [value=4], and the $7^{th}$ digit of the social security number [value=9]; along with a randomly generated digit (415) [value=5].

Here, the values used to form the pass code (405) are 1, 4, 9, and 5. Here, the digits have been randomly ordered to result in a pass code (405) of "1 9 5 4". The corresponding pass code prompt (262) is: "Speak the first digit of your zip code, then the 7th digit of your social security number, then the number 5, and then the 7th digit of your phone number."

Additional Embodiments

In an embodiment, after creating the one-time unique password (405), the electronic device (100) presents the matching password prompt (262) to the user; the device (100) then receives from the user a reply (which is generally intended by the user to be the correct password, as they have understood from the prompt); and the electronic device (100) then determines if the pass code supplied by the user matches the expected one-time pass code (405) created and stored internally by the device, using the methods above.

If the pass code offered by the user matches the expected pass code (405), then the electronic device (100) grants to the user appropriate data access, appropriate device control, appropriate network access, or other suitable control, access, or privileges (for example, unlocking and providing access to a locked box or locked room).

In an alternative embodiment, the electronic device (100) may store the one-time pass code (405), or multiple one-time pass codes, for later possible use.

In an alternative embodiment, a first electronic device may not present the pass code hint directly to the user; instead, the first electronic device may use the methods above to generate the one-time pass code (405), and the matching pass code hint (262), for use by a second electronic device. The first electronic device would transmit the one-time pass code (405) and matching prompt (262) to the second electronic device (preferably the transmission would be done via secure means).

The second electronic device would then prompt the user, receive the user response, and perform comparison and access functions as appropriate.

In an alternative embodiment, the pass code (405) is generated as a result of a mathematical combination of, or mathematical function of or operation on, the selected digits (420) of the PDCSs (290), along with (optionally) additional digits.

For example, the processor may select one or more digits (420) from the personal data records (295), and then may present to the user a natural language prompt (262) for these digits (as already described above). The natural language prompt (262) may then further instruct the user to add the values, to multiply the values, or to perform some more advanced mathematical operation with the values. The result of the addition or multiplication, or other operation, may then be the one-time password (405).

For example, a prompt (262) may indicate:

"Identify the second digit of your social security number, and the third digit of your cell phone number. Multiply these two values. Add the last digit of your social security number. Please recite the resulting value."

Suppose the associated digits for this prompt, and for a particular authorized user, are 4, 2, and 9; then the appropriate password calculation would be (4*2)+9; the one-time password would be the result of this calculation, or "17".

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;

U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;

U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);

U.S. patent application Ser. No. 14/519,233 for HANDHELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

What is claimed is:

1. An electronic device configured for password protection, said electronic device comprising:
   a processor; and
   a memory communicatively coupled to the processor; wherein:
      said memory is configured to store a personal data character string (PDCS) and an associated description of the PDCS, wherein the characters of the PDCS represent personal data associated with an authorized user of the electronic device; and
      said processor is configured to:
         select at random, a subset of characters from the characters of the PDCS, the subset comprising one or more characters of the PDCS;
         generate a one-time password comprising a combination of the one or more selected characters of the PDCS;
         generate a prompt, via a speaker, configured to request the authorized user to provide the one-time password, wherein the prompt comprises an ordinal placement corresponding to each of the one or more selected characters of the PDCS coupled with the associated description of the PDCS;
         receive an input, via a microphone, corresponding to the authorized user having provided the one-time password; and
         provide user access in response to the receipt of the input corresponding to the authorized user having provided the one-time password.

2. The electronic device of claim 1, wherein the processor is further configured to generate the password by combining the one or more selected characters of the PDCS in a random sequential order.

3. The electronic device of claim 1, wherein the processor is further configured to:
   generate one or more additional characters; and
   generate the one-time password as a combination of:
      the one or more selected characters of the PDCS; and
      the one or more additional characters.

4. The electronic device of claim 1 further comprising a user interface which is communicatively coupled to the processor, wherein said user interface is configured to:
   present a data prompt comprising a data category of said PDCS; and
   to receive a data value responsive to the data prompt, wherein:
      said received data value is stored in the memory as the PDCS associated with the data category.

5. The electronic device of claim 4, wherein said user interface comprises at least one of:
   an audio user interface; and
   a voice reception interface.

6. The electronic device of claim 4, wherein the data prompt comprises a data category for a data value which is distinctively associated with the authorized user.

7. The electronic device of claim 6, wherein the generated one-time password consists of one or more digits selected from among a plurality of digits of the stored PDCS.

8. The electronic device of claim 1, wherein the processor is further configured to generate a description of said generated one-time password, said description comprising:
   (a) a data category of the personal data of the PDCS;
   (b) a description of any additional characters of said generated one-time password; and
   (c) a description of an ordering, within the generated one-time password, of the one or more selected characters the additional characters.

9. A computer-readable, non-transitory storage medium storing instructions that, when executed by a processor of an electronic device, causes the processor to execute a method for password access, the method comprising:
   storing in a memory of the electronic device a personal data character string (PDCS) and an associated description of the PDCS, wherein the characters of the PDCS represent personal data associated with an authorized user of the electronic device;
   selecting at random, via the processor, a subset of characters from the characters of the PDCS, the subset comprising one or more characters of the PDCS; and
   generating, via the processor, a one-time password comprising a combination of the one or more selected characters of the PDCS;
   generating, via the processor, a prompt, on a speaker, configured to request the authorized user to provide the one-time password, wherein the prompt comprises an ordinal placement corresponding to each of the one or more selected characters of the PDCS coupled with the associated description of the PDCS; and
   receiving, via the processor, an input, on a microphone, corresponding to the authorized user having provided the one-time password; and
   provide user access in response to the receiving of the input corresponding to the authorized user having provided the one-time password.

10. The computer-readable, non-transitory storage medium of claim 9, wherein the method further comprises generating the one-time password by combining the one or more selected characters of the PDCS in a random sequential order.

11. The computer-readable, non-transitory storage medium of claim 9, wherein the method further comprises:
   generating via the processor one or more additional characters; and
   generating via the processor the one-time password as a combination of:
      the one or more selected characters of the PDCS; and
      the one or more additional characters.

12. The computer-readable, non-transitory storage medium of claim 9, wherein the method further comprises:
   presenting, via a user interface of the electronic device, a data prompt comprising a data category of said PDCS; and
   receiving, via the user interface of the electronic device, a data value responsive to the data prompt, wherein:
      said received data value is stored in the memory as the PDCS associated with the data category.

13. The computer-readable, non-transitory storage medium of claim 12, wherein the data prompt comprises a data category for a data value which is distinctively associated with the authorized user.

14. The computer-readable, non-transitory storage medium of claim 9, wherein the generated one-time password consists of one or more digits selected from among a plurality of digits of the stored PDCS.

15. The computer-readable, non-transitory storage medium of claim 9, wherein the method further comprises generating a description of said generated one-time password, said description comprising:
(a) a data category of the personal data of the PDCS;
(b) an ordinal placement of the one or more selected characters within the PDCS;
(c) a description of any additional characters of said generated one-time password; and
(d) a description of an ordering, within the generated one-time password, of:
the selected characters referred to by (a) and (b), and the additional characters of (c).

16. In an electronic device comprising a processor and a memory which is communicatively coupled to said processor, a method for password access, the method comprising:
storing in the memory of the electronic device a personal data character string (PDCS) and an associated description of the PDCS, wherein the characters of the PDCS represent personal data associated with an authorized user;
selecting at random, via the processor of the electronic device, a subset of characters from the characters of the PDCS, the subset comprising one or more characters of the PDCS;
generating, via the processor of the electronic device, a one-time password comprising a combination of the one or more selected characters of the PDCS;
generating, via the processor of the electronic device, a prompt, on a speaker, configured to request the authorized user to provide the one-time password, wherein the prompt comprises an ordinal placement corresponding to each of the one or more selected characters of the PDCS coupled with the associated description of the PDCS; and
receiving, via the processor of the electronic device, an input, on a microphone, corresponding to the authorized user having provided the one-time password; and
providing, via the processor of the electronic device, user access in response to the receiving of the input corresponding to the authorized user having provided the one-time password.

17. The method of claim 16, further comprising generating the one-time password by combining the one or more selected characters of the PDCS in a sequential order which is randomly determined.

18. The method of claim 16, wherein the ordinal placement corresponding to a selected character comprises the ordinal placement of the selected character in the PDCS, counting from left to right.

19. The method of claim 16, wherein the personal data comprises information being non-unique to the authorized user.

20. The method of claim 16, wherein the personal data comprises a zip code and the associated description of the personal data comprises the words "zip code".

21. The method of claim 16, wherein the personal data comprises a name and wherein the associated description of the personal data comprises an identification of the name.

* * * * *